(12) United States Patent
Sakamoto

(10) Patent No.: US 7,837,339 B2
(45) Date of Patent: Nov. 23, 2010

(54) OPEN VEHICLE REARVIEW MIRROR SYSTEM FOR SWITCHING BETWEEN NORMAL AND BLIND-SPOT VIEWS

(75) Inventor: Hiroshi Sakamoto, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 29 days.

(21) Appl. No.: 11/896,469

(22) Filed: Aug. 31, 2007

(65) Prior Publication Data
US 2008/0080074 A1  Apr. 3, 2008

(30) Foreign Application Priority Data
Sep. 1, 2006  (JP) ............................. 2006-237517

(51) Int. Cl.
*B60R 1/072* (2006.01)
(52) U.S. Cl. ...................................... 359/842; 359/843
(58) Field of Classification Search ................. 359/842, 359/843, 877
See application file for complete search history.

(56) References Cited

U.S. PATENT DOCUMENTS

| | | | | |
|---|---|---|---|---|
| 2,588,792 A | * | 3/1952 | Wilson | 359/606 |
| 3,383,154 A | * | 5/1968 | Reed | 359/843 |
| 4,318,590 A | * | 3/1982 | Hanley | 359/214 |
| 4,640,590 A | * | 2/1987 | Wunsch | 359/877 |
| 4,746,206 A | * | 5/1988 | Kusztos et al. | 359/555 |
| 4,770,522 A | | 9/1988 | Alten | |
| 4,834,522 A | * | 5/1989 | Janowicz | 359/877 |
| 4,907,870 A | * | 3/1990 | Brucker | 359/875 |
| 5,226,034 A | * | 7/1993 | Nagayama et al. | 359/873 |
| 5,737,136 A | * | 4/1998 | Boggiatto | 359/843 |
| 5,745,310 A | * | 4/1998 | Mathieu | 359/843 |
| 5,990,649 A | * | 11/1999 | Nagao et al. | 318/568.1 |
| 6,672,731 B2 | * | 1/2004 | Schnell et al. | 359/877 |
| 6,840,637 B2 | * | 1/2005 | Wang | 359/843 |
| 2005/0236203 A1 | | 10/2005 | Toftner | |

FOREIGN PATENT DOCUMENTS

| | | |
|---|---|---|
| DE | 200 21 527 U1 | 6/2001 |
| JP | 01168539 A * | 7/1989 |
| JP | 2-303943 A | 12/1990 |

\* cited by examiner

*Primary Examiner*—Mark Consilvio
(74) *Attorney, Agent, or Firm*—Arent Fox LLP

(57) ABSTRACT

An open vehicle rear view system includes left and right mirror housings. A mirror holder for holding a mirror is supported in each mirror housing so as to pivot between a normal view position for obtaining a normal rear view and a changed view position which is changed from the normal view position. An actuator is provided between the mirror housing and the mirror holder. The actuator includes an electric motor rotatable in forward and reverse directions and a reduction mechanism for reducing output of the electric motor. A drive control circuit controls operation of the electric motors so as to simultaneously pivot both the mirror holders according to operation of an operating member operated by a driver in order to select the normal view position or the changed view position of the mirror holders. Thus, it is possible to easily change a rear view when necessary, while eliminating the need for the driver to change his posture and reducing electric power consumption.

9 Claims, 17 Drawing Sheets

OPEN VEHICLE REARVIEW MIRROR SYSTEM FOR SWITCHING BETWEEN NORMAL AND BLIND-SPOT VIEWS

CROSS-REFERENCE TO RELATED APPLICATION

This application claims the priority of JP Application No. 2006-237517, filed Sep. 1, 2006, the entire specification claims and drawings of which are incorporated herewith by reference.

BACKGROUND OF THE INVENTION

1. Field of the Invention

The present invention relates to an open vehicle rear view system comprising: a pair of mirrors for obtaining a rear view, the mirrors being disposed on left and right portions of a vehicle body or a handlebar in front of a driver. The present invention relates particularly to an improvement of an open vehicle rear view system wherein a region of a rear view is changed when necessary.

2. Description of the Related Art

Japanese Patent Application Laid-open No. 2-303943 discloses a rear view mirror of an open vehicle such as a motorcycle, wherein the mirror is inclined inward from a normal position in response to change in a rider's posture in a high-speed traveling where the posture is inclined forward.

In Japanese Patent Application Laid-open No. 2-303943 where the mirror is inclined inward according to the driver's posture as the speed of the motorcycle increases, a solenoid is used for driving the mirror. In order to instantaneously pivot the mirror, which is positioned by means of a relatively large retaining force for vibration-isolation, with a force exceeding the retaining force, it is necessary to set a high output of the solenoid. Further, because the solenoid is always required to be provided with electric power, this conventional mirror is unsuitable for an open vehicle having a relatively small generation capacity.

SUMMARY OF THE INVENTION

The present invention has been accomplished in the light of such circumstances, and it is an object thereof to provide an open vehicle rear view system wherein a driver can easily change a rear view when necessary without changing his posture, while reducing electric power consumption.

In order to achieve the above object, according to a first feature of the present invention, there is provided an open vehicle rear view system comprising: a pair of mirrors for obtaining a rear view, the mirrors being disposed on left and right portions of a vehicle body or a handlebar in front of a driver; wherein the system further comprises: mirror housings mounted on the left and right portions of the vehicle body or the handlebar; mirror holders each holding the mirror, and being supported on the mirror housing so that the mirror holder can pivot between a normal view position for obtaining a normal rear view and a changed view position which is changed from the normal view position; actuators each including an electric motor rotatable in forward and reverse directions and a reduction mechanism for reducing output of the electric motor, each actuator being provided between the mirror housing and the mirror holder so as to exert power for pivoting the mirror holder; an operating member operated by the driver in order to select the normal view position or the changed view position of the mirror holders; and a drive control circuit including two pairs of position detection switches which are disposed at fixed positions within the two mirror housings in order to detect the normal view position and the changed view position of the mirror holders and determine a timing for terminating operation of the electric motors, and controlling operation of the electric motors so as to pivot the two mirror holders simultaneously according to operation of the operating member.

An operating lever 80 of embodiments corresponds to the operating member of the present invention.

With the first feature, the pair of left and right mirror holders each holding a mirror are simultaneously pivoted between the normal view position and the changed view position in response to the operation of the operating member by the driver on the open vehicle. Therefore, the rider can easily change the region of the view without changing his posture. Moreover, the actuator is equipped with the electric motor and the reduction mechanism, and can terminate the operation of the electric motor in response to the position detection switches detecting the normal view position and the changed view position of the mirror holder. Therefore, it is possible to obtain a high speed and high output pivoting drive force, and reduce power consumption by operating the electric motor only when necessary. Thus, the system is effectively applicable to an open vehicle with low power generation capacity or an open vehicle without a battery.

According to a second feature of the present invention, in addition to the first feature, each actuator comprises a drive arm which has a base end connected to the reduction mechanism so as to be pivoted by the reduction mechanism and a leading end connected to the mirror holder.

With the second feature, the mirror holder is pivoted by pivoting the drive arm of the actuator. Therefore, the mirror holder can be rapidly pivoted by a sufficient torque in a wide range while reducing required operation amount of the electric motor.

According to a third feature of the present invention, in addition to the first or second feature, a pivot axis of each mirror holder is set in a vertical direction when the open vehicle is in an upright state, in order to change a direction of the mirror to be more outward in the changed view position than in the normal view position.

With the third feature, the driver can obtain an outwardly shifted rear view when necessary without changing his posture.

According to a fourth feature of the present invention, in addition to the first or second feature, a pivot axis of each mirror holder is set so that the pivot axis is inclined inward to the vehicle body in going upward when the open vehicle is in an upright state, in order to change a direction of the mirror to be lower and more inward to the vehicle body in the changed view position than in the normal view position.

With the fourth feature, when the driver changes his posture to be inclined forward, the rear view can be changed to be lower and more inward to the vehicle body, thereby obtaining an appropriate rear view according to the posture of the driver.

According to a fifth feature of the present invention, in addition to the first or second feature, a pivot axis of each mirror holder is set to be substantially horizontal when an open vehicle is in an upright state, in order to change a direction of the mirror to be more upward in the changed view position than in the normal view position.

With the fifth feature, the driver can obtain an appropriate rear view corresponding to a change in the attitude of the vehicle body due to a change in the weight of a load on a rear part of the open vehicle.

According to a sixth feature of the present invention, in addition to any of the first to fifth features, the drive control circuit comprises a switch circuit which switches the direction of rotation of the electric motors according to operation and non-operation of the operating member so that the electric motors cause the mirror holders to pivot to the changed view position in response to operation where the operating member urged to a side selecting the normal view position is operated to a side selecting the changed view position, and so that the electric motors cause the mirror holders to pivot to the normal view position in response to release of an operating force applied to the operating member.

With the sixth feature, the mirror holder pivots toward the changed view position in response to operation of the operating member which is urged to the side selecting the normal view position, and the mirror holder automatically returns to the normal view position when the operating force applied to the operating member is released, thereby obtaining an excellent operability of the operating member.

According to a seventh feature of the present invention, in addition to any of the first to sixth features, the operating member is disposed on the handlebar so as to be operated by the driver grabbing the handlebar.

With the seventh feature, the operating member is disposed on the handlebar so that it can be operated by the rider grabbing the handlebar, thereby further improving the operability of the operating member.

According to an eighth feature of the present invention, in addition to any of the first to seventh features, the reduction mechanism is arranged so as to transmit a pivoting drive force to the mirror holder after an operation amount of the electric motor has reached a predetermined operation amount.

With the eighth feature, the mirror holder is pivoted after the output of the electric motor becomes sufficiently large. Therefore, it is possible to improve the vibration-isolation while retaining the mirror holder in the normal view position and in the changed view position with a relatively large force, and downsize the electric motor can be reduced.

According to a ninth feature of the present invention, in addition to any of the first to eighth features, the system further comprises click mechanisms each provided between the mirror housing and the mirror holder, each click mechanism causes the mirror holder to pivot stepwise between the normal view position and the changed view position.

With the ninth feature, the mirror holder is retained both at the normal view position and the changed view position without consuming power, thereby improving the vibration-isolation. Thus, the system is effectively applicable to an open vehicle having a small power generation capacity or an open vehicle without a battery.

The above-mentioned features, other features, characteristics, and advantages of the present invention will become apparent from a preferred embodiment which will be described in detail below by reference to the attached drawings.

DESCRIPTION OF THE PREFERRED EMBODIMENTS

FIG. 1 to FIG. 11 show a first embodiment of the present invention.

Figure 1:
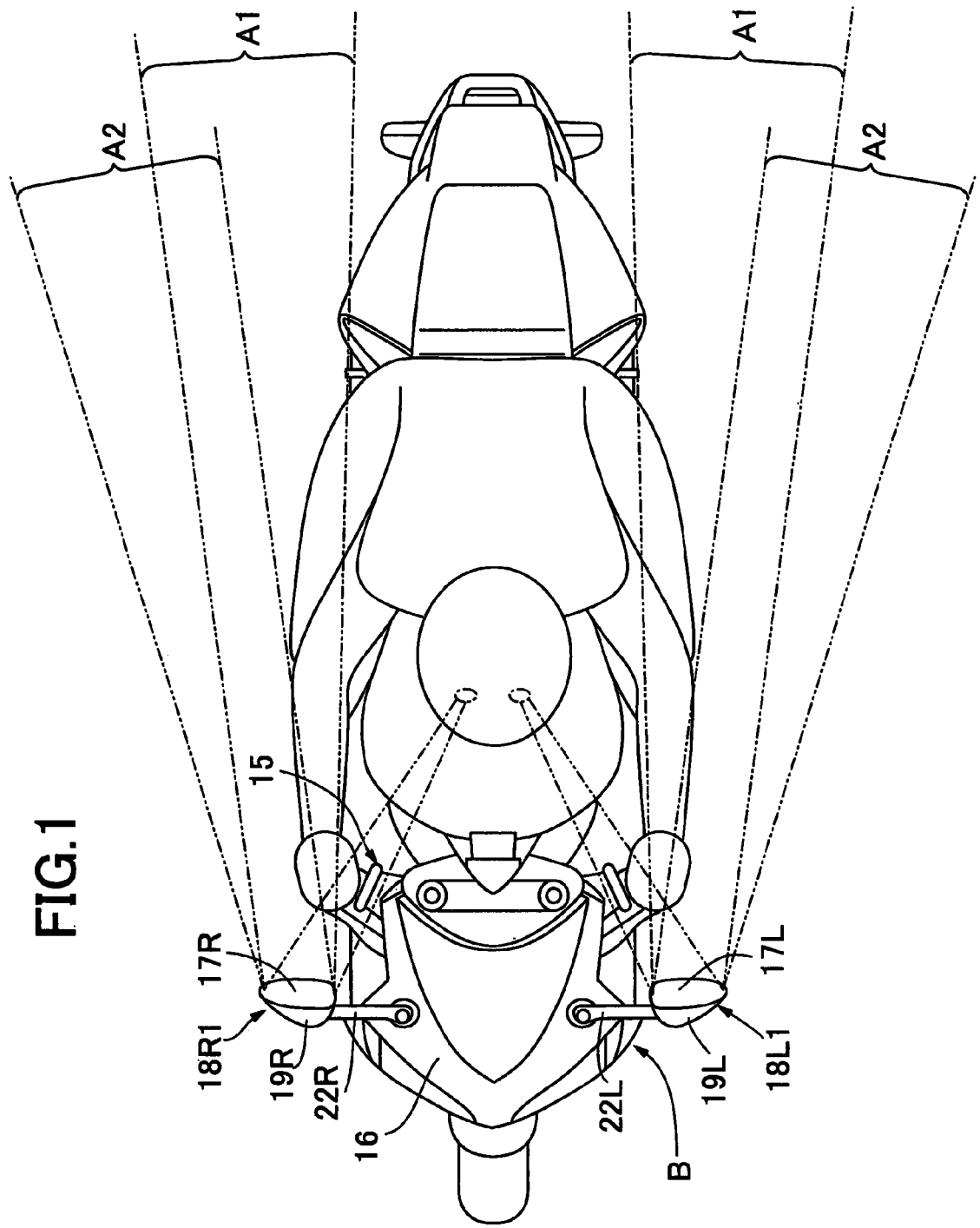
FIG. 1 is a plan view of a motorcycle including a device of a first embodiment.
Figure 2:
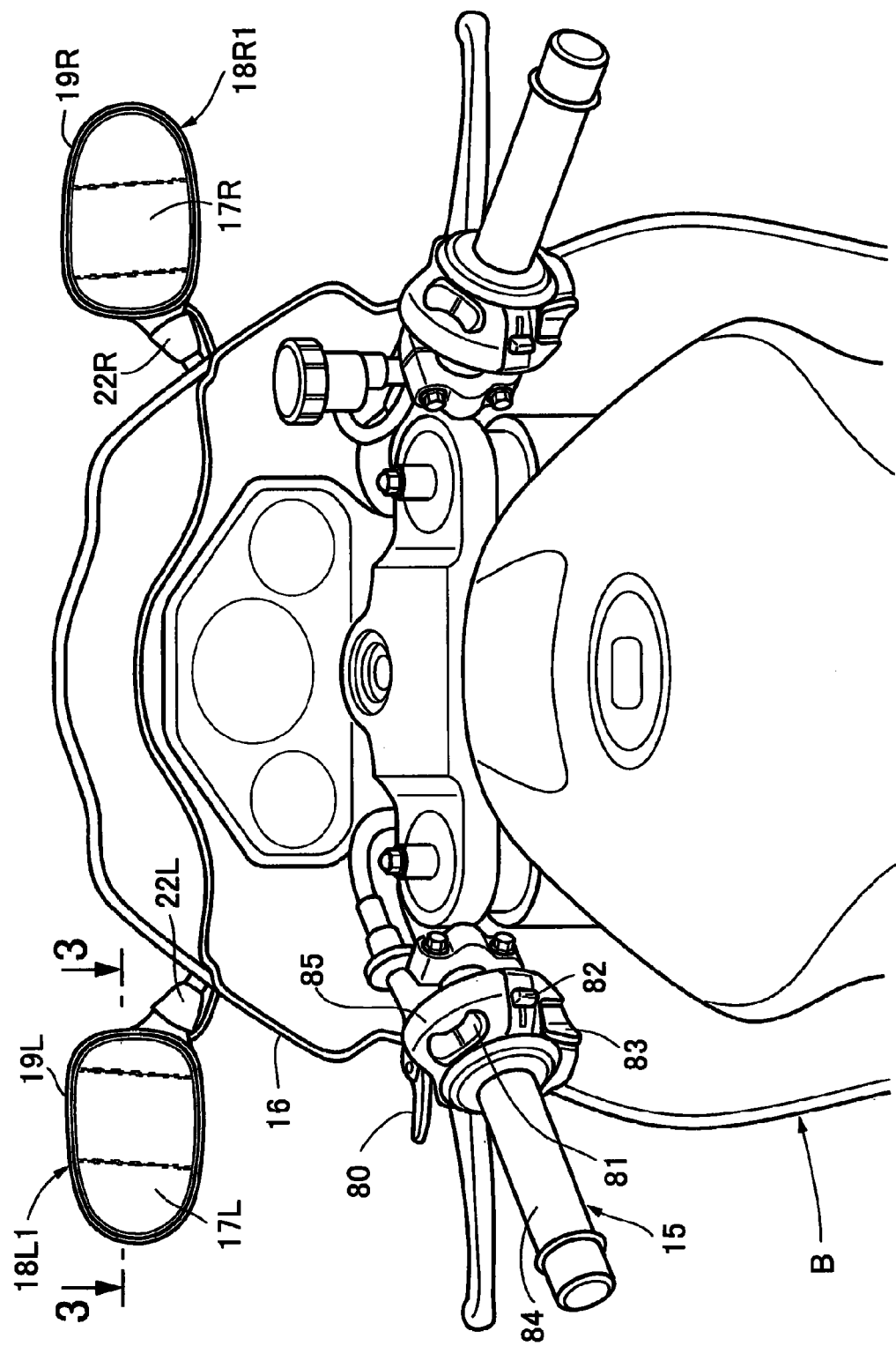
FIG. 2 is a view of a front part of the motorcycle taken from a rider's side.

First, in FIG. 1 and FIG. 2, a motorcycle, which is an open vehicle, has bar-shaped handlebars 15 steerably supported on a vehicle body B. A front cover 16 forming part of the vehicle body B is disposed in front of the bar-shaped handlebars 15 so as to cover the handlebars 15 from the front. A pair of a left mirror 17L and a right mirror 17R for obtaining a rear view are disposed on left and right parts of the front cover 16 in front of a rider.

A rear view system according to the present invention has a left-side viewing section 18L1 disposed on the left-side of the front cover 16 when facing forward in the traveling direction of the motorcycle, and a right-side viewing section 18R1 disposed on the right-side of the front cover 16. The left-side viewing section 18L1 and the right-side viewing section 18R1 are formed symmetrically with respect to a vertical plane running through the center in the width direction of the vehicle body B.

Figure 3:
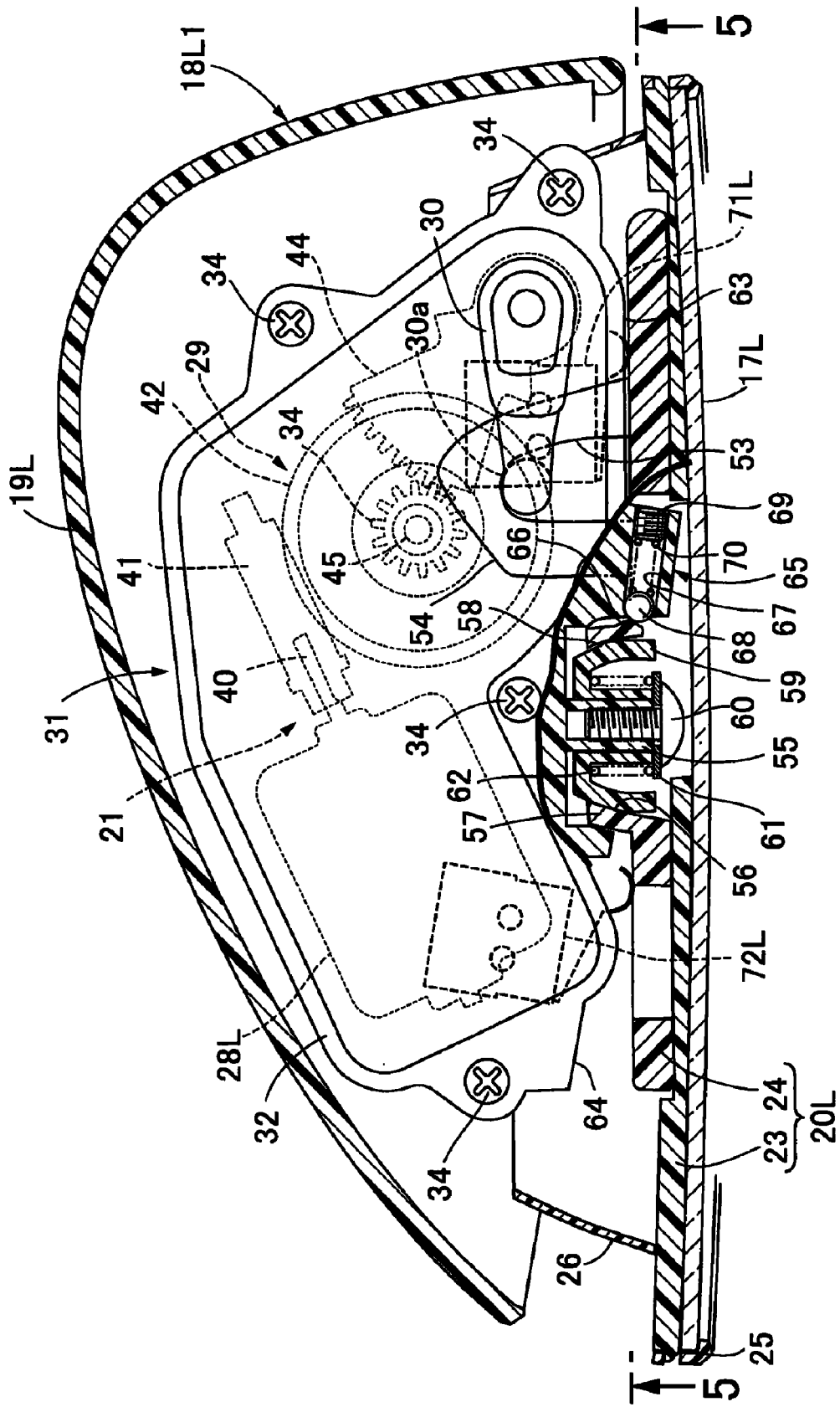
FIG. 3 is an enlarged sectional view along line 3-3 in FIG. 2 in a state in which a mirror holder is in a normal view position.
Figure 4:
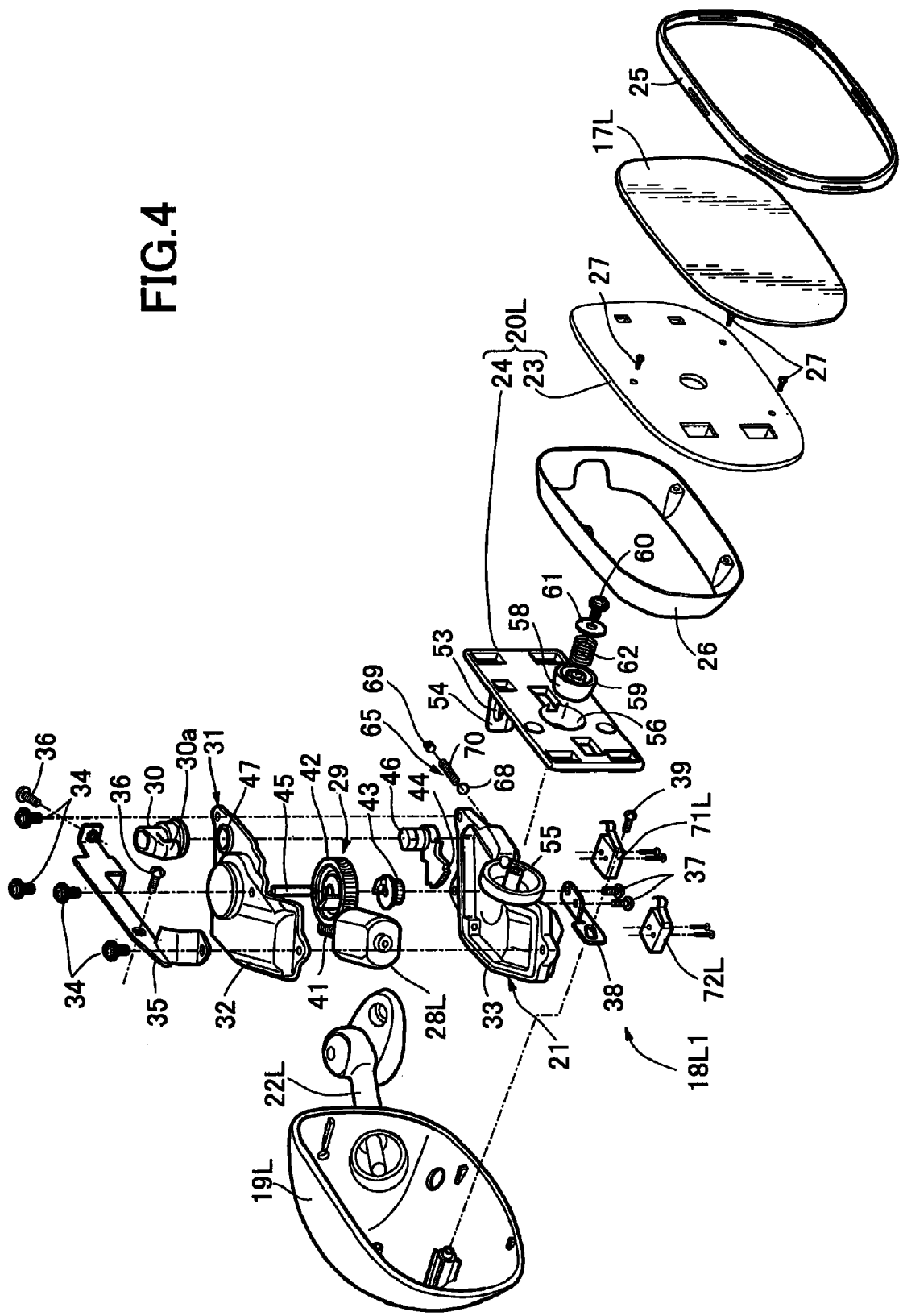
FIG. 4 is an exploded perspective view of a left-side viewing section.
Figure 5:
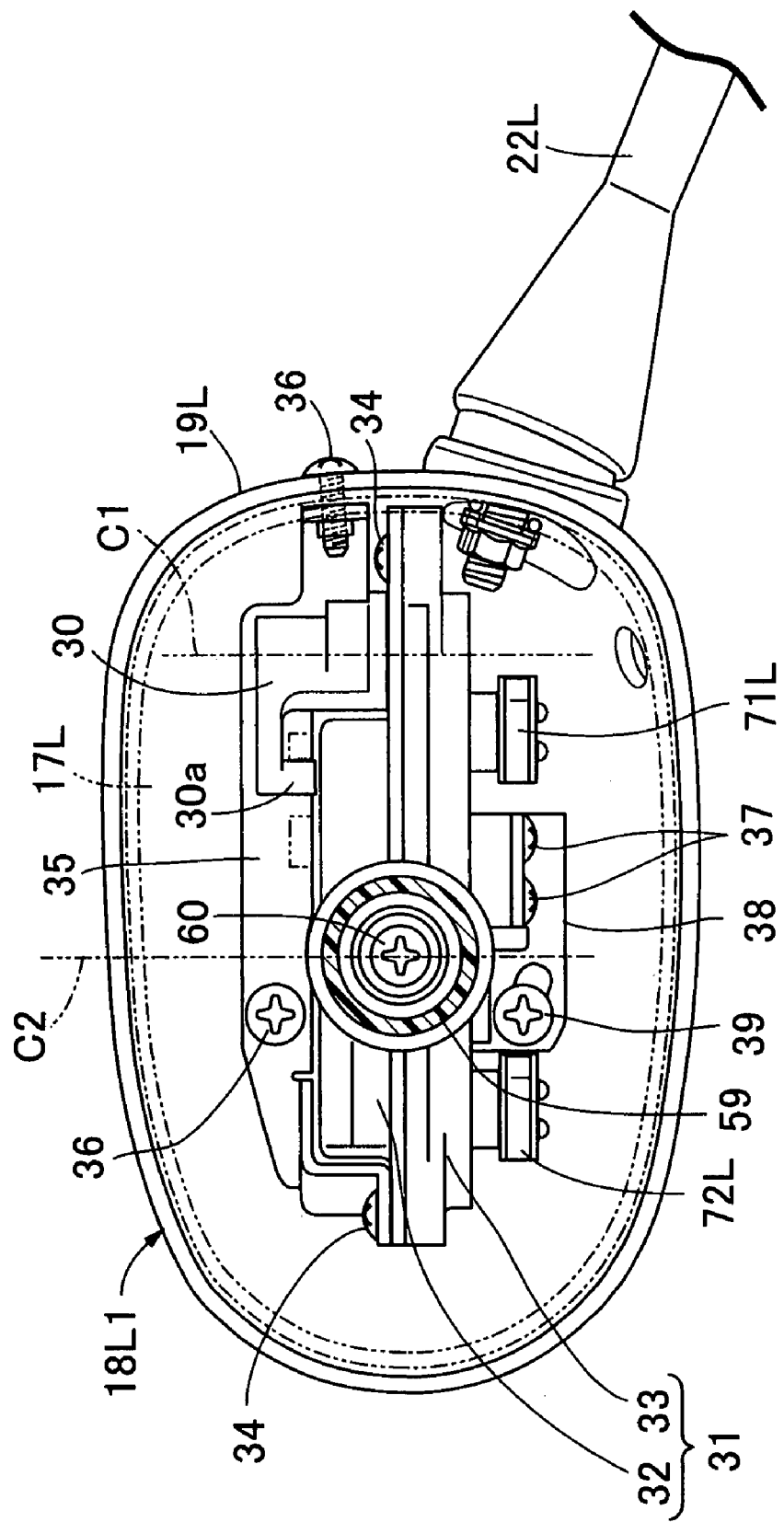
FIG. 5 is a sectional view along line 5-5 in FIG. 3.

Referring to FIG. 3 to FIG. 5 together, the left-side viewing section 18L1 includes: a mirror housing 19L mounted on the left-side of the front cover 16; a mirror holder 20L holding the left mirror 17L and supported on the mirror housing 19L so that it can pivot between a normal view position for obtaining a normal rear view and a changed view position in which the left mirror 17L is directed further outward than in the normal view position; and an actuator 21 provided between the mirror housing 19L and the mirror holder 20L.

The mirror housing 19L is formed in a rearwardly-opening bowl shape, and is supported on a leading end of a stay 22L having its base end mounted on the front cover 16 so that it can swivel in a limited range.

The mirror holder 20L comprises a holder plate 24 and a holding member 23 for holding the left mirror 17L, the holding member 23 being joined to the holder plate 24. The mirror holder 20L is disposed in an opening of the mirror housing 19L. An endless bezel 25 is fitted around outer peripheral edge parts of the holding member 23 and the left mirror 17L. An endless skirt 26 extending to the mirror housing 19L is fastened to an outer peripheral edge part on the inner side of the holding member 23 by means of a plurality of screw members 27 so as to prevent a gap from being generated between the mirror housing 19L and the outer peripheral edge part of the mirror holder 20L regardless of pivoting of the mirror holder 20L.

The actuator 21 includes: an electric motor 28L that can rotate in forward and reverse directions; a reduction mechanism 29 for reducing the speed of the output of the electric motor 28L; and a drive arm 30 having its base end connected to the reduction mechanism 29 so as to be pivoted by the reduction mechanism 29 and having its leading end connected to the mirror holder 20L. The electric motor 28L and the reduction mechanism 29 are housed within an actuator case 31. The drive arm 30 projects from the actuator case 31.

The actuator case 31 is formed by securing together, by means of a plurality of screw members 34, first and second case halves 32 and 33 which are open on sides facing each other. The actuator case 31 is disposed within the mirror housing 19L in an attitude in which the first case half 32 is positioned upward. An upper support member 35 is mounted on the first case half 32 by means of two of the plurality of screw members 34 securing the first and second case halves 32 and 33 to each other. The upper support member 35 is secured to the mirror housing 19L by means of a pair of screw members 36. A lower support member 38 is mounted on the second case half 33 by means of a pair of screw members 37, and is secured to the mirror housing 19L by means of a screw member 39.

The reduction mechanism 29 comprises: a worm gear 41 connected coaxially and relatively unrotatably to an output shaft 40 of the electric motor 28L; a worm wheel 42 meshing with the worm gear 41; an intermediate gear 43 disposed coaxially with the worm wheel 42 capable of transmitting power from the worm wheel 42; and a sector gear 44 meshing with the intermediate gear 43. The worm wheel 42 and the intermediate gear 43, which face each other, are rotatably supported by a common first shaft 45 supported on the actuator case 31. A second shaft 46 provided integrally with the sector gear 44 runs rotatably through a support hole 47 provided in the first case half 32 and projects upward. The drive arm 30 has its base end relatively unrotatably connected to the part of second shaft 46 projecting from the actuator case 31.

Figure 6:
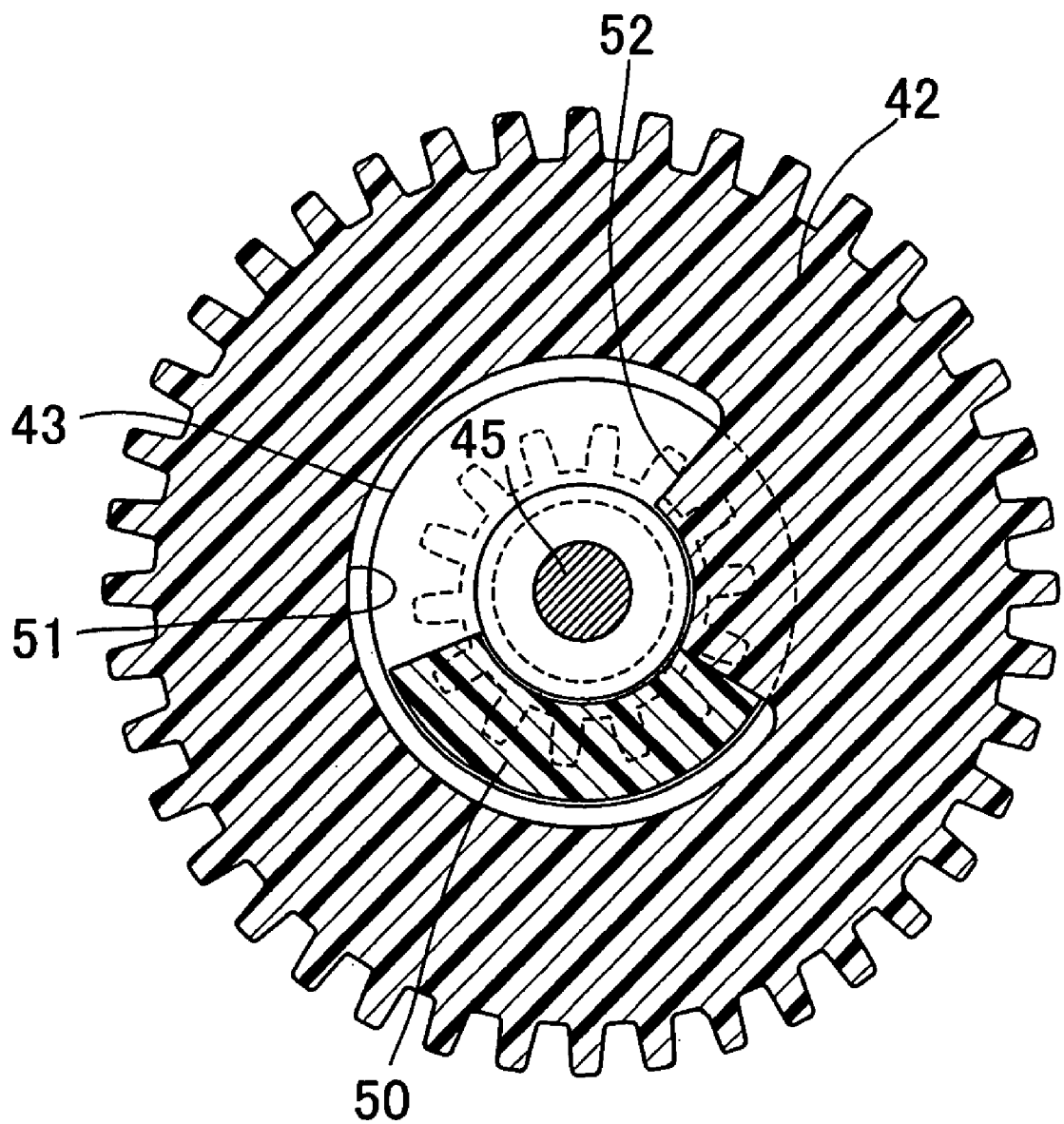
FIG. 6 is a transverse sectional view showing part of a reduction mechanism.

In FIG. 6, an arc-shaped latching projection 50 having its center on the axis of the first shaft 45 is projectingly provided integrally with a face of the intermediate gear 43 opposite the worm wheel 42. On the other hand, provided on a face of the worm wheel 42 opposite the intermediate gear 43 are an arc-shaped recess 51 which enables movement of the latching projection 50 so as to allow relative pivoting of the worm wheel 42 and the intermediate gear 43 around the axis of the first shaft 45. An engagement portion 52 is disposed between opposite ends of the recess 51 so that the engagement portion 52 can abut against the latching projection 50.

That is, power can be transmitted from the worm wheel 42 to the intermediate gear 43 by the engagement portion 52 abutting against the latching projection 50. The reduction mechanism 29 transmits a pivoting drive force to the mirror holder 20L after the operation amount of the electric motor 28L reaches a predetermined operation amount.

The drive arm 30 has a connecting projection 30a provided integrally at its leading end. A connecting part 54 is projectingly provided integrally with an inner face of the holder plate 24 of the mirror holder 20L. The connecting part 54 forms a connection hole 53 in cooperation with the inner face of the holder plate 24. The connecting projection 30a runs through the connection hole 53.

A cylindrical support shaft 55 is projectingly provided integrally with a portion, facing the mirror holder 20L, of the second case member 32 of the actuator case 31. On the other hand, a tubular portion 57 is provided on the holder plate 24 of the mirror holder 20L so as to surround the support shaft 55. The tubular portion 57 has, on its inner peripheral face, a receiving portion 56 having an arc-shaped longitudinal cross section and facing the holding member 23. The support shaft 55 projecting into the receiving portion 56 is axially movably provided with a support member 59 having a support seating face 58. The support seating face 58 has an arc-shaped longitudinal cross section, and is in sliding contact with the receiving portion 56. A spring 62 is provided under compression between the support member 59 and a retainer 61 fixed to the extremity of the support shaft 55 by means of a screw member 60. The spring 62 urges the support member 59 in a direction to bring the support seating face 58 into sliding contact with the receiving portion 56.

In this way, the holder plate 24 forming a part of the mirror holder 20L is swingably supported on the second case half 33 of the actuator case 31 so that the receiving portion 56 is in sliding contact with the support seating face 58. In this embodiment, as shown in FIG. 5, a pivot axis C1 of the drive arm 30 extends in the vertical direction, and thus the mirror holder 20L pivots around an axis C2 parallel to the pivot axis C1 by means of operation of the actuator 21.

The mirror holder 20L is supported on the actuator case 31 fixed to the mirror housing 19L so that it can pivot between a normal view position (position shown in FIG. 3) for obtaining a normal rear view and a changed view position (position shown in FIG. 7) in which the left mirror 17L is directed further outward than in the normal view position. The rear view region in the normal view position is a region shown by A1 in FIG. 1, whereas the rear view region in the changed view position is a region shown by A2 in FIG. 1. That is, the view extends further outward in the changed view position than in the normal view position.

Further, the actuator case 31 is provided with a restricting face 63 and a restricting face 64. The restricting face 63 determines the normal view position by abutting against the holder plate 24 of the mirror holder 20L in the normal view position. The restricting face 64 determines the changed view position by abutting against the holder plate 24 in the changed view position.

A click mechanism 65 is provided between the mirror housing 19L and the mirror holder 20L. The click mechanism 65 pivots stepwise the mirror holder 20L between the normal view position and the changed view position. In this embodiment, the click mechanism 65 is provided between the actuator case 31 fixed to the mirror housing 19L and the tubular portion 57 provided integrally with the holder plate 24 of the mirror holder 20L.

The click mechanism 65 includes: a projection 66 that is provided on the outer periphery of the tubular portion 57 and has a triangular longitudinal section; a spherical body 68 that is housed in one end part of a housing hole 67 provided in the second case half 33 of the actuator case 31 in a portion corresponding to the projection 66 and that can abut against the outer periphery of the tubular portion 66; and a click spring 70 provided in a compressed state between the spherical body 68 and a cover member 69 fixed to the second case half 33 so as to close the other end of the housing hole 67.

The mirror holder 20L pivots between the normal view position and the changed view position while the spherical body 68 rides over the projection 66. A force is required to push the spherical body 68 into the housing hole 67 against the spring force of the click spring 70, so that the mirror holder 20L pivots stepwise between the normal view position and the changed view position.

Figure 7:
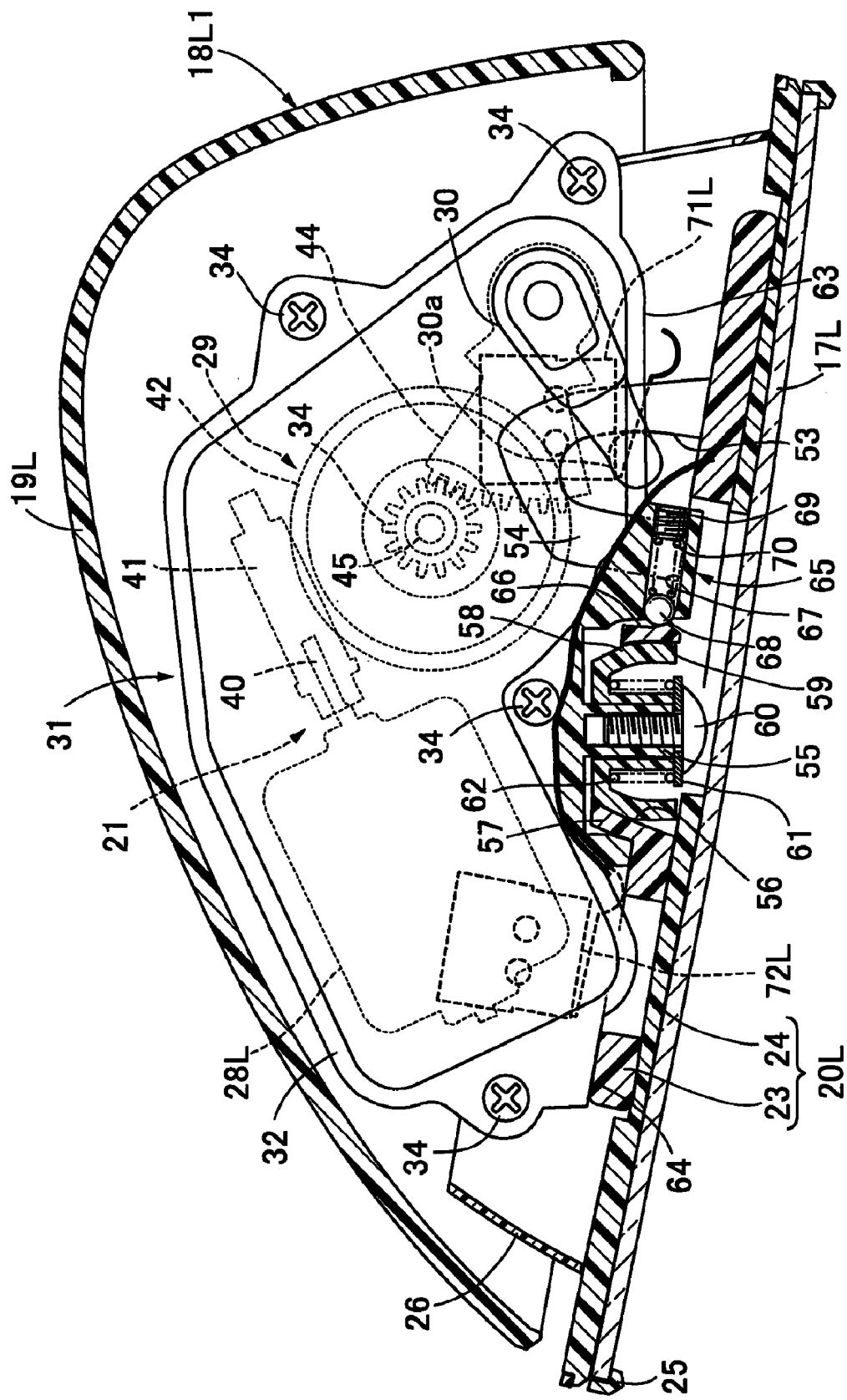
FIG. 7 is a sectional view, corresponding to FIG. 3, in a state in which the mirror holder is in a changed view position.

As shown in FIG. 3, a normal view position detection switch 71L and a changed view position detection switch 72L are provided in a lower part of the second case half 33 of the actuator case 31. The normal view position detection switch 71L detects that the mirror holder 20L has attained the normal view position by being pushed by the holder plate 24 of the mirror holder 20L. The changed view position detection switch 72L detects that the mirror holder 20L has attained the changed view position by being pushed by the holder plate 24 as shown in FIG. 7.

The normal view position detection switch 71L determines the timing of terminating the operation of the electric motor 28L of the actuator 21 by cutting off the power, when the mirror holder 20L attains the normal view position while the electric motor 28L is operating so as to pivot the mirror holder 20L from the changed view position toward the normal view position. The changed view position detection switch 72L determines the timing of terminating the operation of the electric motor 28L of the actuator 21 by cutting off the power, when the mirror holder 20L attains the changed view position while the electric motor 28L is operating so as to pivot the mirror holder 20L from the normal view position toward the changed view position.

The mirror housing 19R of the right-side viewing section 18R1 is supported on a leading end of a stay 22R having its base end mounted on the front cover 16 so that the mirror housing 19R can swivel in a restricted range. Because the right-side viewing section 18R1 is formed symmetrically with the left-side viewing section 18L1, detailed explanation of its structure is omitted.

Figure 8:
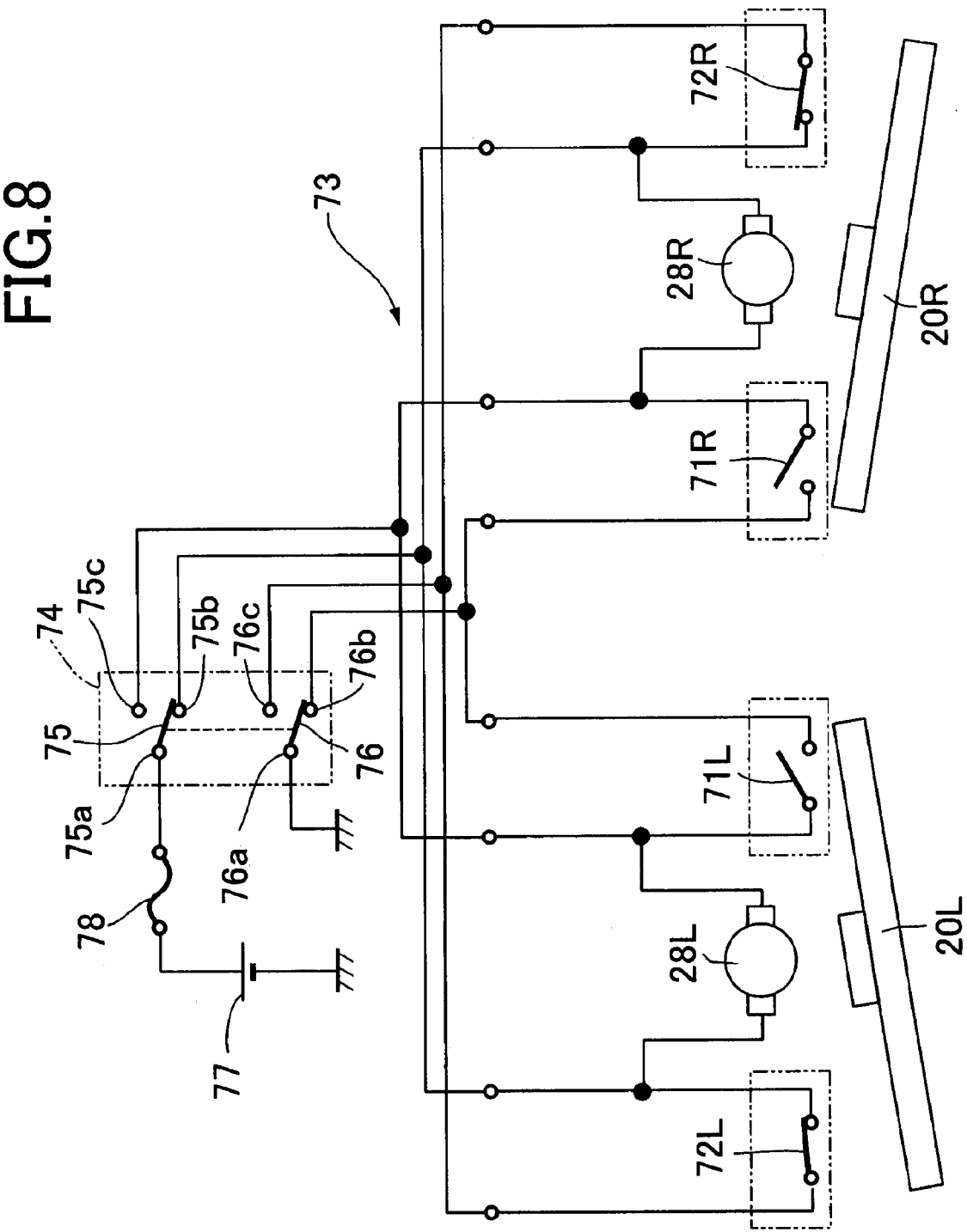
FIG. 8 is a diagram showing the arrangement of a drive control circuit in a state in which the mirror holder is in the normal view position.

In FIG. 8, a drive control circuit 73 controls operation of the electric motor 28L for exerting the power to pivot the mirror holder 20L of the left-side viewing section 18L1, and operation of the electric motor 28R for exerting the power to pivot the mirror holder 20R of the right-side viewing section 18R1 such that the two mirror holders 20L and 20R pivot simultaneously. The drive control circuit 73 includes: the normal view position detection switch 71L and the changed view position detection switch 72L of the left-side viewing section 18L1; a normal view position detection switch 71R and a changed view position detection switch 72R of the right-side viewing section 18R1; and a switch circuit 74.

The switch circuit 74 comprises first and second switches 75 and 76 which are operatively connected to each other. The first switch 75 includes: a first common contact 75a connected to a battery 77 via a fuse 78; and first and second individual contacts 75b and 75c, the connection/disconnection thereof with respect to the first common contact 75a being alternatively switched. The second switch 76 comprises: a grounded second common contact 76a; and third and fourth individual contacts 76b and 76c, the connection/disconnection thereof with respect to the second common contact 76a being alternatively switched. Further, the switch circuit 74 alternatively switches over between a first switching mode and a second switching mode. In the first switching mode, the first switch 75 connects the first common contact 75a to the first individual contact 75b, and the second switch 76 connects the second common contact 76a to the third individual contact 76b. In the second switching mode, the first switch 75 connects the first common contact 75a to the second individual contact 75c, and the second switch 76 connects the second common contact 76a to the fourth individual contact 76c.

This switching between the switching modes of the switch circuit 74 is carried out by operation of an operating lever 80 shown in FIG. 2. The operating lever 80 is disposed on the handlebars 15 so that it can be operated by a rider grabbing the handlebars 15. In this embodiment, the operating lever 80 is pivotably supported on a switch case 85 provided on the handlebars 15 so as to be adjacent to a grip 84 at the left-hand end of the handlebars 15 such that it can be operated by the left hand of the rider grabbing the grip 84. The operating lever 80 is urged to the side to bring the switch circuit 74 into the first switching mode. The switch case 85 is provided with a headlight operation switch 81, an indicator operation switch 82, and a horn operation switch 83 and other components. That is, when no operating force is applied to the operating lever 80, the switch circuit 74 is in the first switching mode, and when the operating lever 80 is grabbed and pivoted, the switch circuit 74 enters the second switching mode.

Referring again to FIG. 8, in the drive control circuit 73, one end of the electric motor 28L of the left-side viewing section 18L1 and one end of the electric motor 28R of the right-side viewing section 18R1 are connected in parallel to the second individual contact 75c of the first switch 75 of the switch circuit 74, and are also connected in parallel to the third individual contact 76b of the second switch 76 of the switch circuit 74 via the normal view position detection switch 71L of the left-side viewing section 17L and the normal view position detection switch 71R of the right-side viewing section 18R1. The other ends of the two electric motors 28L and 28R are connected in parallel to the first individual contact 75b of the first switch 75 of the switch circuit 74, and are also connected in parallel to the fourth individual contact 76c of the second switch 76 of the switch circuit 74 via the changed view position detection switch 72L of the left-side viewing section 18L1 and the changed view position detection switch 72R of the right-side viewing section 18R1.

Figure 9:
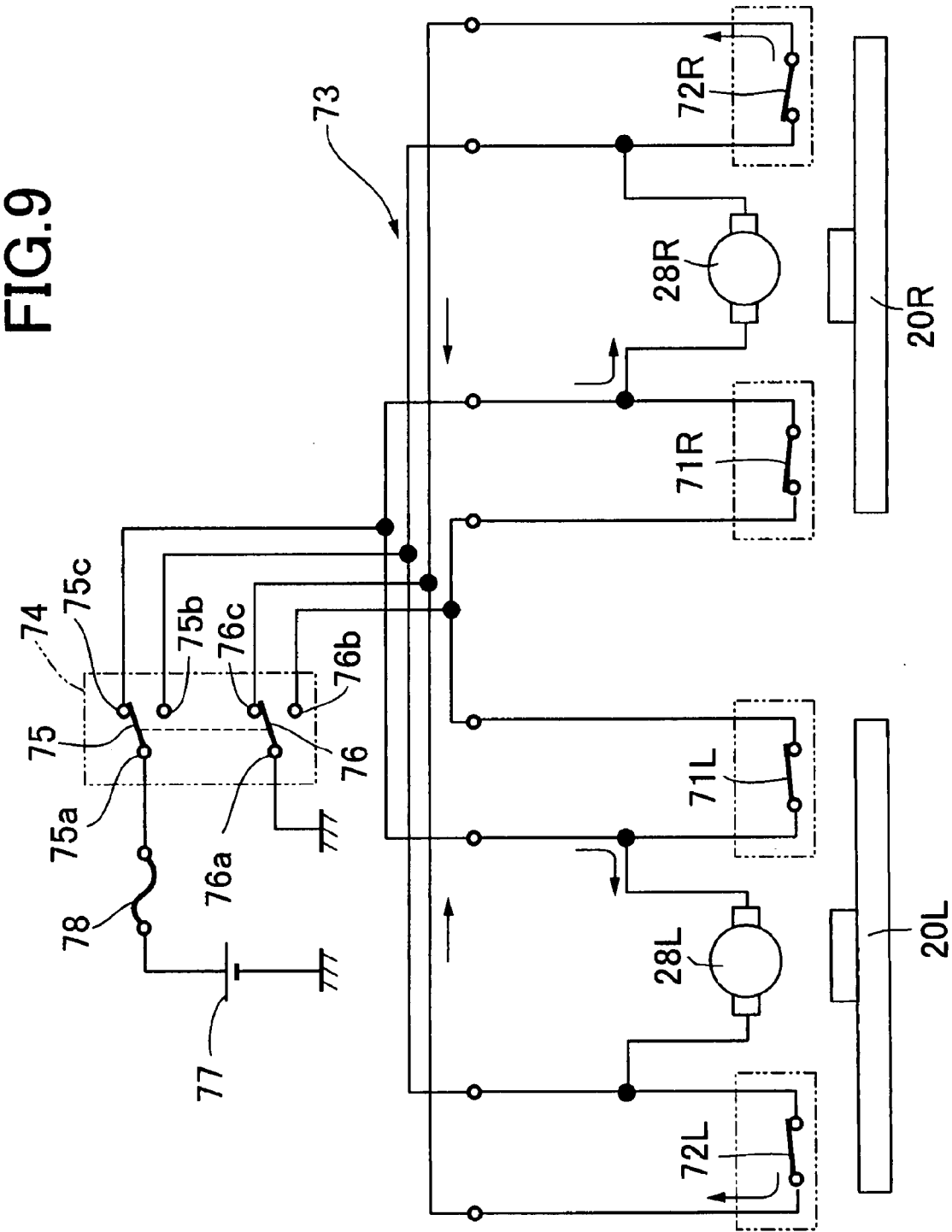
FIG. 9 is a diagram, corresponding to FIG. 8, in which the mirror holder is partway through moving from the normal view position to the changed view position side.

In this drive control circuit 73, when the switch circuit 74 is in the first switching mode with the operating lever 80 in a non-operated state, the normal view position detection switches 71L and 71R are cut off as shown in FIG. 8. Therefore, no current is supplied to the two electric motors 28L and 28R. In this state, by operating the operating lever 80 so as to switch the switch circuit 74 into the second switching mode as shown in FIG. 9, current is made to flow through the two electric motors 28L and 28R as shown by arrows, and the two mirror holders 20L and 20R are simultaneously pivoted toward the changed view position, whereby the normal view position detection switches 71L and 71R are put into a connected state in response to the pivoting of the two mirror holders 20L and 20R toward the changed view position side.

Figure 10:
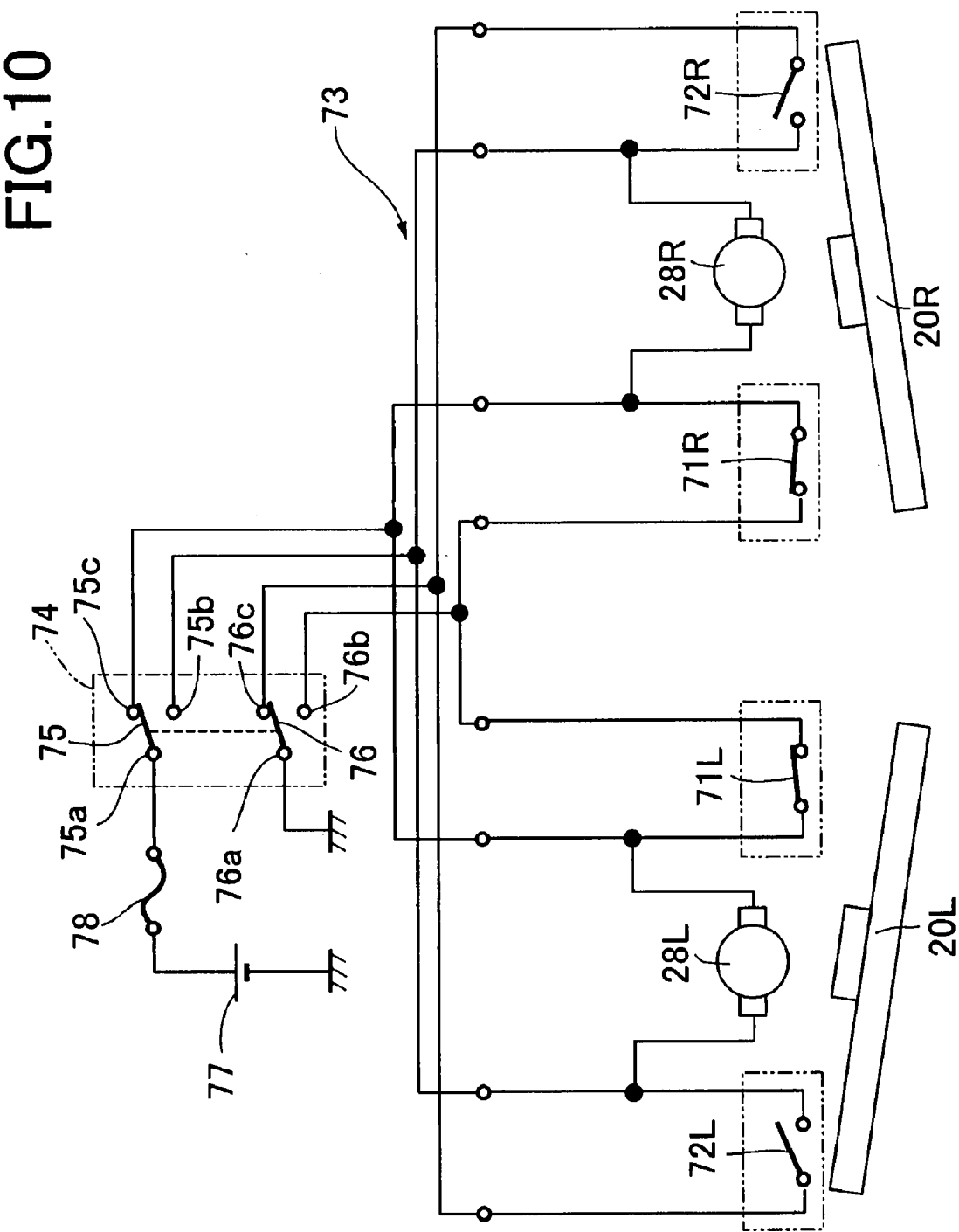
FIG. 10 is a diagram, corresponding to FIG. 8, of a state in which the mirror holder is pivoted to the changed view position.

By continuing the operation of the operating lever 80 so that the mirror holders 20L and 20R pivot to the changed view position, as shown in FIG. 10, the changed view position detection switches 72L and 72R attain a disconnected state, and passage of current to the two electric motors 28L and 28R is cut.

Figure 11:
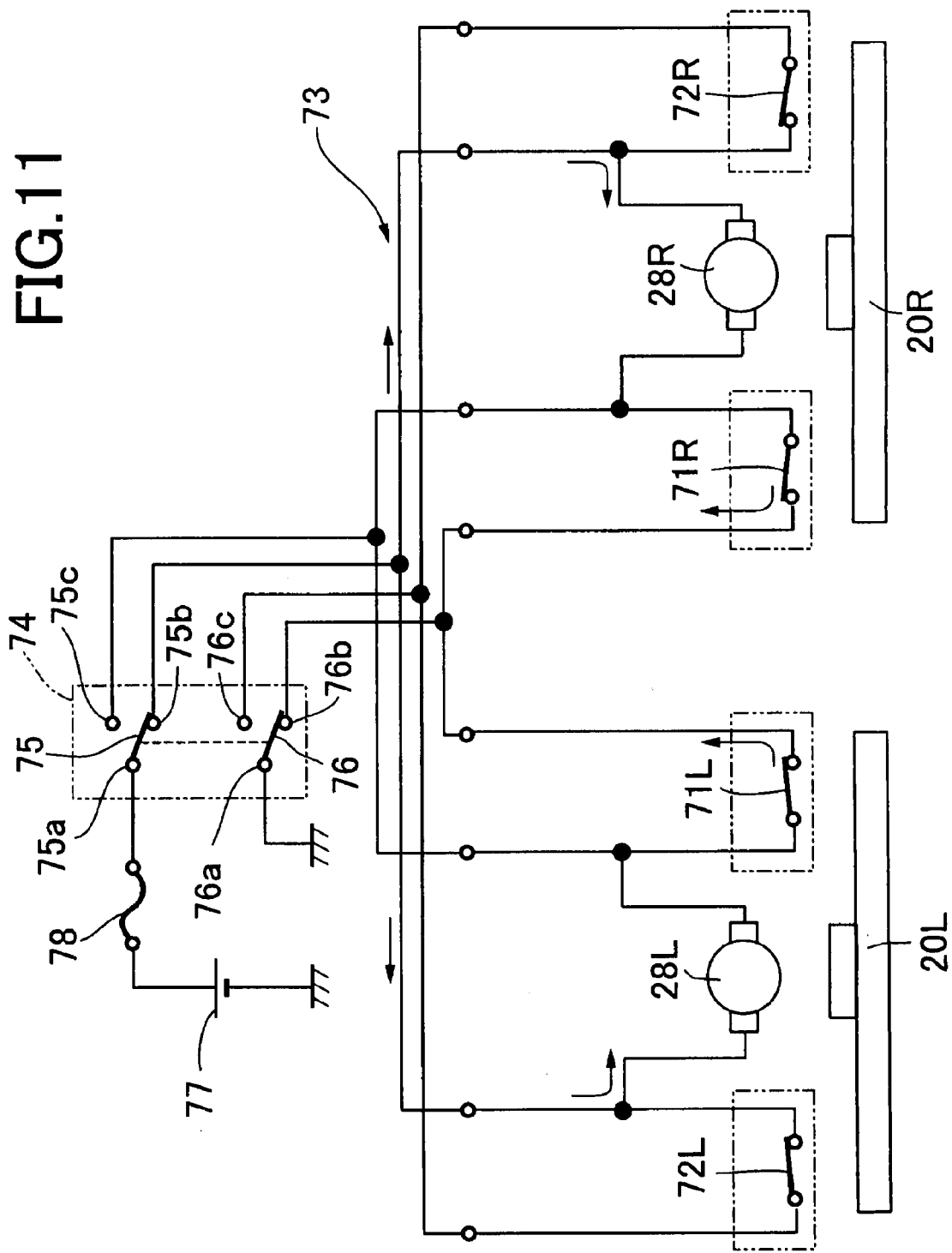
FIG. 11 is a diagram, corresponding to FIG. 8, in which the mirror holder is partway through moving from the changed view position to the normal view position side.

By terminating the operation of applying an operating force to the operating lever 80 and allowing the operating lever 80 to return to the original position, the switch circuit 74 attains the first switching mode, that is, the normal view position detection switches 71L and 71R are in the connected state. Therefore, current flows through the two electric motors 28L and 28R, as shown in FIG. 11, in opposite directions to those shown by arrows in FIG. 9, and the two mirror holders 20L and 20R are simultaneously pivoted toward the normal view position. When the two mirror holders 20L and 20R reach the normal view position, the operating state of the drive control circuit 73 returns to the state shown in FIG. 8.

In this way, the operating lever 80, which is operated by the rider in order to select either one of the normal view position or the changed view position of the two mirror holders 20L and 20R, is urged toward the side in which the switch circuit 74 is in the first switching mode, that is, the side in which the normal view position of the two mirror holders 20L and 20R is selected; the drive control circuit 73 operates the electric motors 28L and 28R so as to pivot the mirror holders 20L and 20R to the changed view position in response to operation of the operating lever 80 toward the side in which the changed view position is selected; and operates the electric motors 28L and 28R so as to pivot the mirror holders 20L and 20R to the normal view position in response to the operating force acting on the operating lever 80 being released.

The operation of this first embodiment is now described. The mirror holders 20L and 20R hold the left and right mirrors 17L and 17R respectively, and are supported on the mirror housings 19L and 19R mounted on the left and right portions of the front cover 16 in the vehicle body B. The mirror holders 20L and 20R can pivot between the normal view position for obtaining a normal rear view, and the changed view position in which the two mirrors 17L and 17R are directed further outward than in the normal view position. The actuators 21 include: the electric motors 28L and 28R rotatable in forward and reverse directions; and the reduction mechanisms 29 for reducing the speed of the output of the electric motors 28L and 28R. The actuators 21 are provided between the mirror housings 19L and 19R and the mirror holders 20L and 20R so as to exert a power for pivoting the mirror holders 20L and 20R. The drive control circuit 73 controls the operation of the two electric motors 28L and 28R so that the two mirror holders 20L and 20R are pivoted simultaneously in response to operation of the operating lever 80 operated by the rider in order to select the normal view position or the changed view position of the mirror holders 20L and 20R. Therefore, the rider can easily obtain a wide rear view range without changing his posture.

Further, the drive control circuit 73 includes the two pairs of position detection switches 71L and 72L; 71R and 72R in order to detect the normal view position and the changed view position of the mirror holders 20L and 20R, and determine the timing of terminating the operation of the electric motors 28L and 28R, the position detection switches 71L and 72L; 71R and 72R being disposed at fixed positions within the two mirror housings 19L and 19R. The operation of the electric motors 28L and 28R can be terminated in response to the position detection switches 71L and 72L; 71R and 72R detecting the normal view position and the changed view position of the mirror holders 20L and 20R. Therefore, it is possible to obtain a high speed and strong output pivoting drive force, reduce the power consumption by operating the electric motors 28L and 28R only when necessary. Thus the system is effectively applicable to a motorcycle with low generation capacity or a motorcycle with no battery.

Furthermore, the actuators 21 include the drive arms 30 whose base ends are connected to the reduction mechanisms 29 so that they are pivoted by the reduction mechanisms 29 and whose leading ends are connected to the mirror holders 20L and 20R; and the mirror holders 20L and 20R are pivoted by pivoting the drive arms 30. Therefore, the mirror holders 20L and 20R can be rapidly pivoted by a sufficient torque in a wide range while reducing required operation amount of the electric motors 28L and 28R.

Moreover, the drive control circuit 73 includes the switch circuit 74 which switches the direction of operation of the electric motors 28L and 28R in response to operation/non-operation of the operating lever 80. Specifically, the switch circuit 74 operates the electric motors 28L and 28R so as to pivot the mirror holders 20L and 20R to the changed view position in response to the operating lever 80, which is urged to the side selecting the normal view position, being operated toward the side selecting the changed view position; and operates the electric motors 28L and 28R so as to pivot the mirror holder 20L and 20R to the normal view position in response to the operating force applied to the operating lever 80 being released. That is, the mirror holders 20L and 20R pivot toward the changed view position in response to operation of the operating lever 80 urged toward the side selecting the normal view position; and when the operating force applied to the operating lever 80 is released, the mirror holders 20L and 20R automatically return to the normal view position, thereby improving the operability.

Moreover, since the operating lever 80 is disposed on the handlebars 15 so that it can be operated by a rider grabbing the handlebars 15, the operability of the operating lever 80 can be enhanced.

The reduction mechanisms 29 are arranged so that the pivoting drive force is transmitted to the mirror holders 20L and 20R after the operation amount of the electric motors 28L and 28R has reached a predetermined operation amount. In this arrangement of the reduction mechanisms 29, the mirror holders 20L and 20R are pivoted after the output of the electric motors 28L and 28R becomes sufficiently large. Therefore, the vibration-isolation can be improved by retaining the mirror holders 20L and 20R in the normal view position or the changed view position with a relatively large force, thereby downsizing the electric motors 28L and 28R.

Moreover, the click mechanisms 65 are provided between the mirror housings 19L and 19R and the mirror holders 20L and 20R so as to cause the mirror holders 20L and 20R to be pivoted stepwise between the normal view position and the changed view position. Therefore, the vibration-isolation can be enhanced by retaining the mirror holders 20L and 20R at the normal view position and the changed view position without consuming power. Thus, the system is effectively applicable to a motorcycle with low generation capacity or a motorcycle with no battery.

Figure 12:
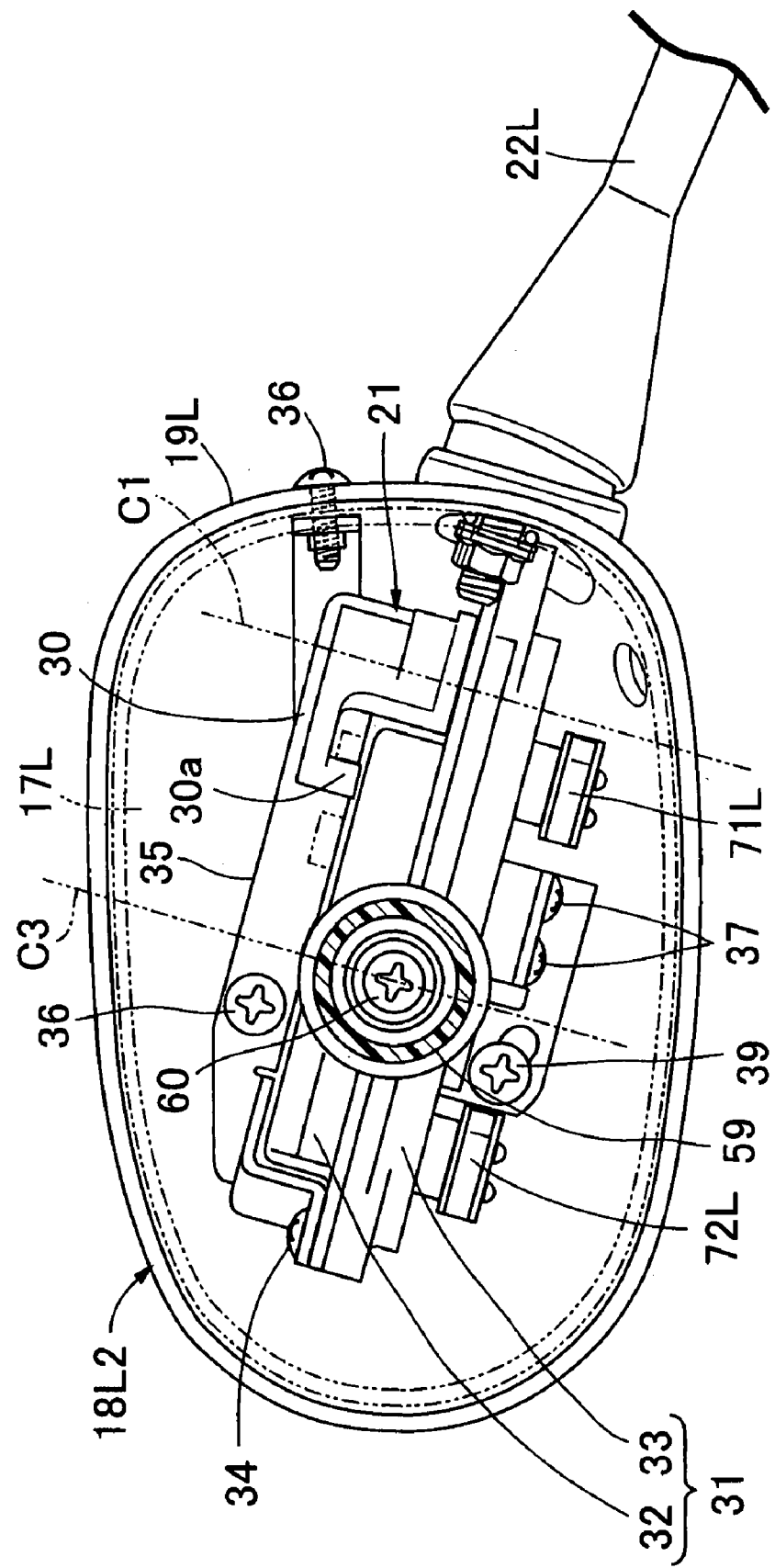
FIG. 12 is a sectional view, corresponding to FIG. 5, of a second embodiment.

FIG. 12 to FIG. 14 show a second embodiment of the present invention. Parts corresponding to those in the first embodiment above are denoted by the same reference numerals and symbols, and detailed explanation thereof is omitted.

First, in FIG. 12, an actuator case 31 is housed and fixed within a mirror holder 20L of a left-side viewing section 18L2 so that a pivot axis C1 of a drive arm 30 is inclined inward to a vehicle body in going upward when a motorcycle is in an upright state, and the mirror holder 20L (see the first embodiment) pivots around an axis C3 parallel to the pivot axis C1. An actuator 21 housed in the actuator case 31 with the drive arm 30, which is connected to the mirror holder 20L, projecting out of the actuator case 31, and a drive control circuit 73 (see the first embodiment) for controlling operation of the actuator 21, are set so that the drive arm 30 is pivoted in a direction opposite to that of the first embodiment. When the view region is changed from a normal view position to a changed view position, the direction in the changed view position of a mirror 17L pivoting around the axis C3 is lowered and more inward to the vehicle body than in the normal view position.

Figure 13A:
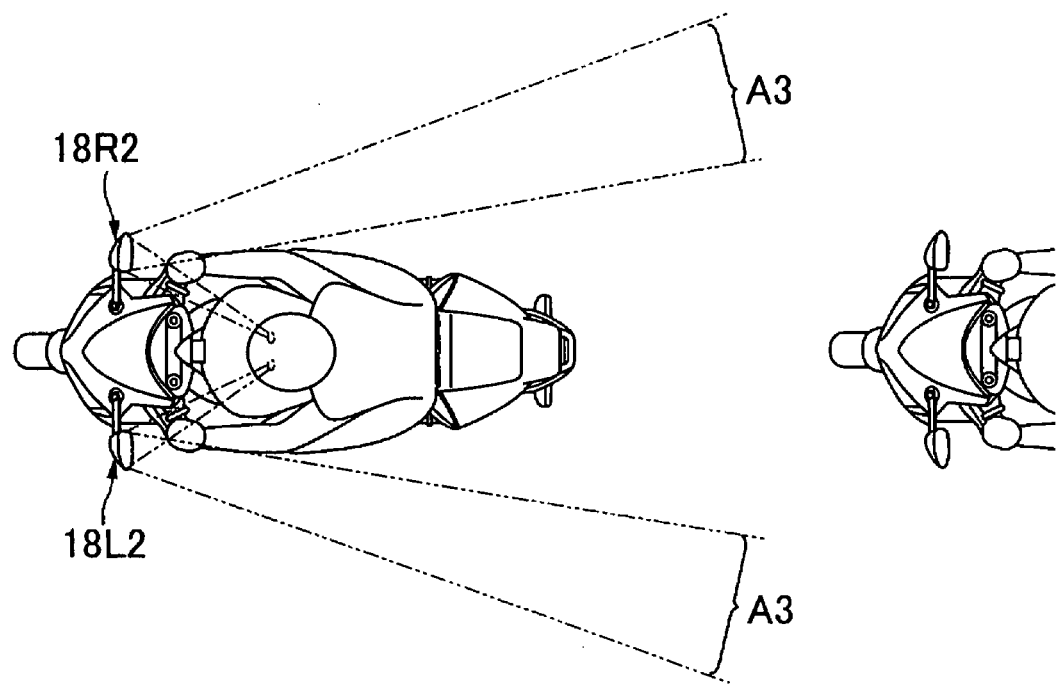
FIG. 13A is a plan view showing a rear view region in the normal view position when the posture of the rider is forwardly inclined.
Figure 13B:
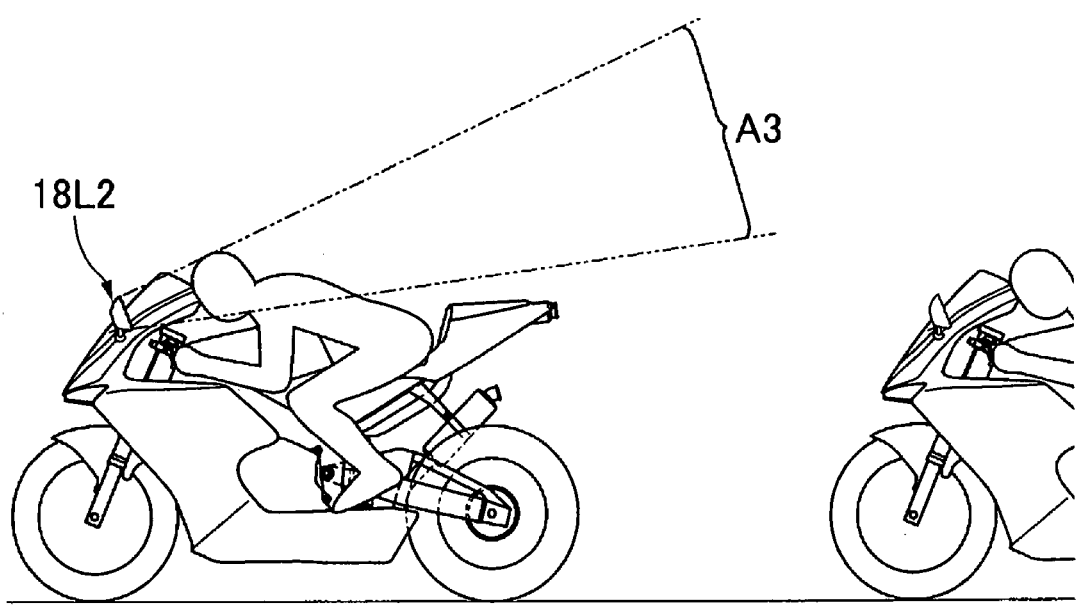
FIG. 13B is a side view showing the rear view region in the normal view position when the posture of the rider is forwardly inclined.

As shown in FIG. 13, a right-side viewing section 18R2 is formed in the same manner as that of the left-side viewing section 18L2. A rear view region A3 is obtained by the rider when his posture is inclined forward in a state in which the left-side viewing section 18L2 and the right-side viewing section 18R2 are in the normal view position. The rear view region A3 is directed outward as shown in FIG. 13A in plan view, and is directed upward as shown in FIG. 13B in side view. Therefore, the rider has a difficulty in obtaining a view of a following vehicle and the like.

Figure 14A:
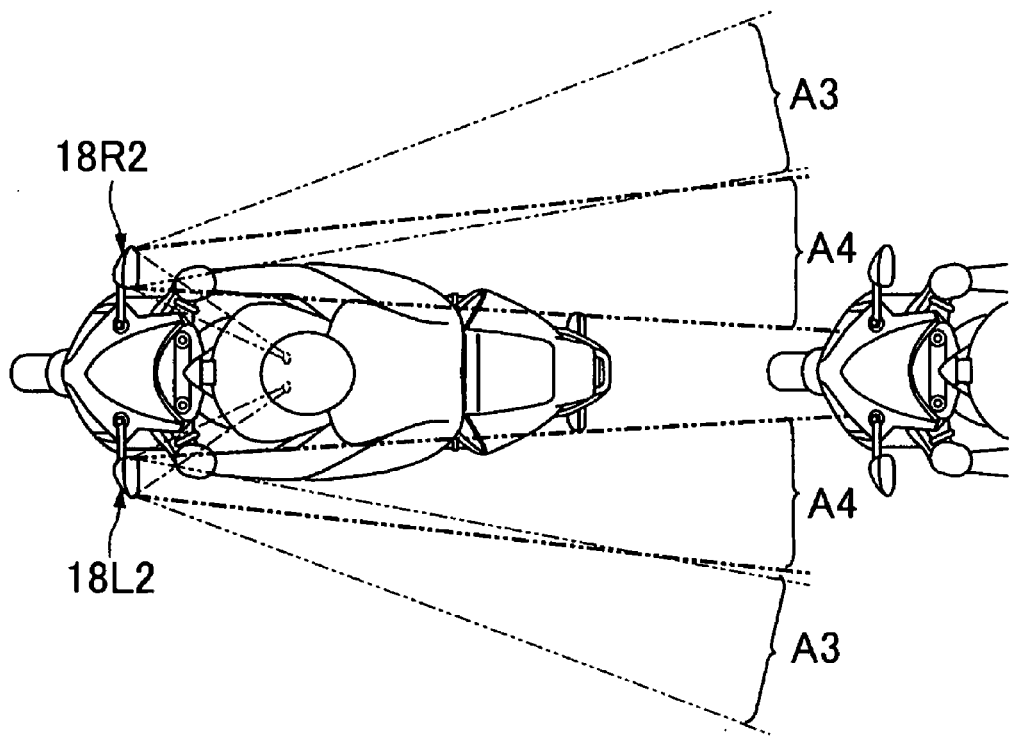
FIG. 14A is a plan view showing a rear view region in the changed view position when the posture of the rider is forwardly inclined.
Figure 14B:
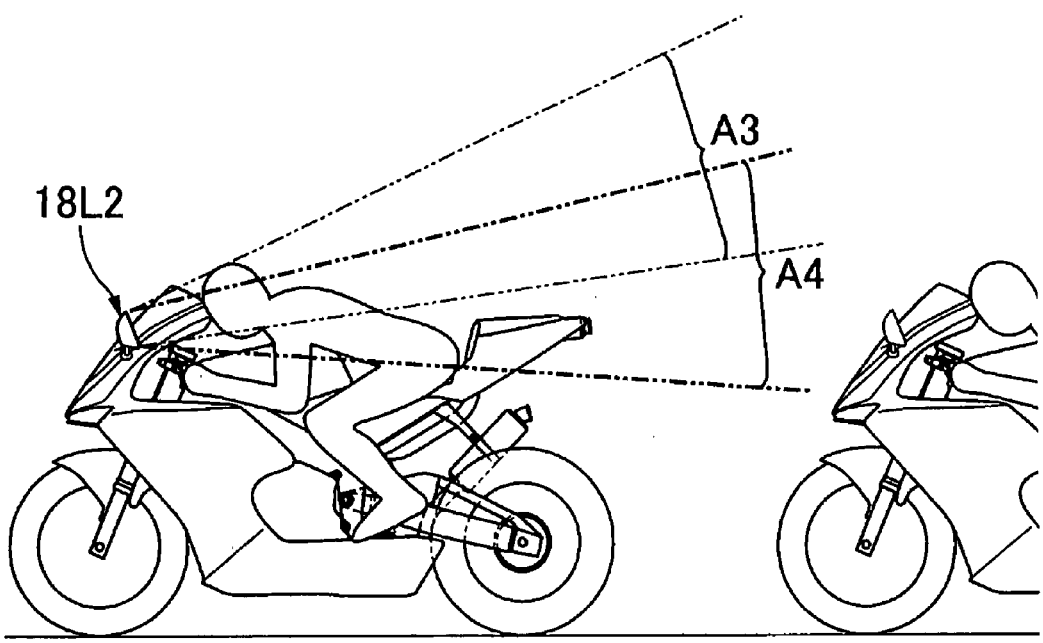
FIG. 14B is a side view showing the rear view region in the changed view position when the posture of the rider is forwardly inclined.

When the posture of the rider is inclined forward, if the left-side viewing section 18L2 and the right-side viewing section 18R2 is changed into the changed view position, a rear view region A4 is directed more inward in plan view as shown in FIG. 14A than the rear view region A3 in the normal view position, and more downward in side view as shown in FIG. 14B than the rear view region A3 in the normal view position. Therefore, the rider can easily obtain a view of a following vehicle and the like.

That is, when the posture of the rider is inclined forward, the rear view can be changed so as to be lower and more inward to the vehicle body, whereby the rider can obtain an appropriate rear view corresponding to the posture of the rider.

Figure 15:
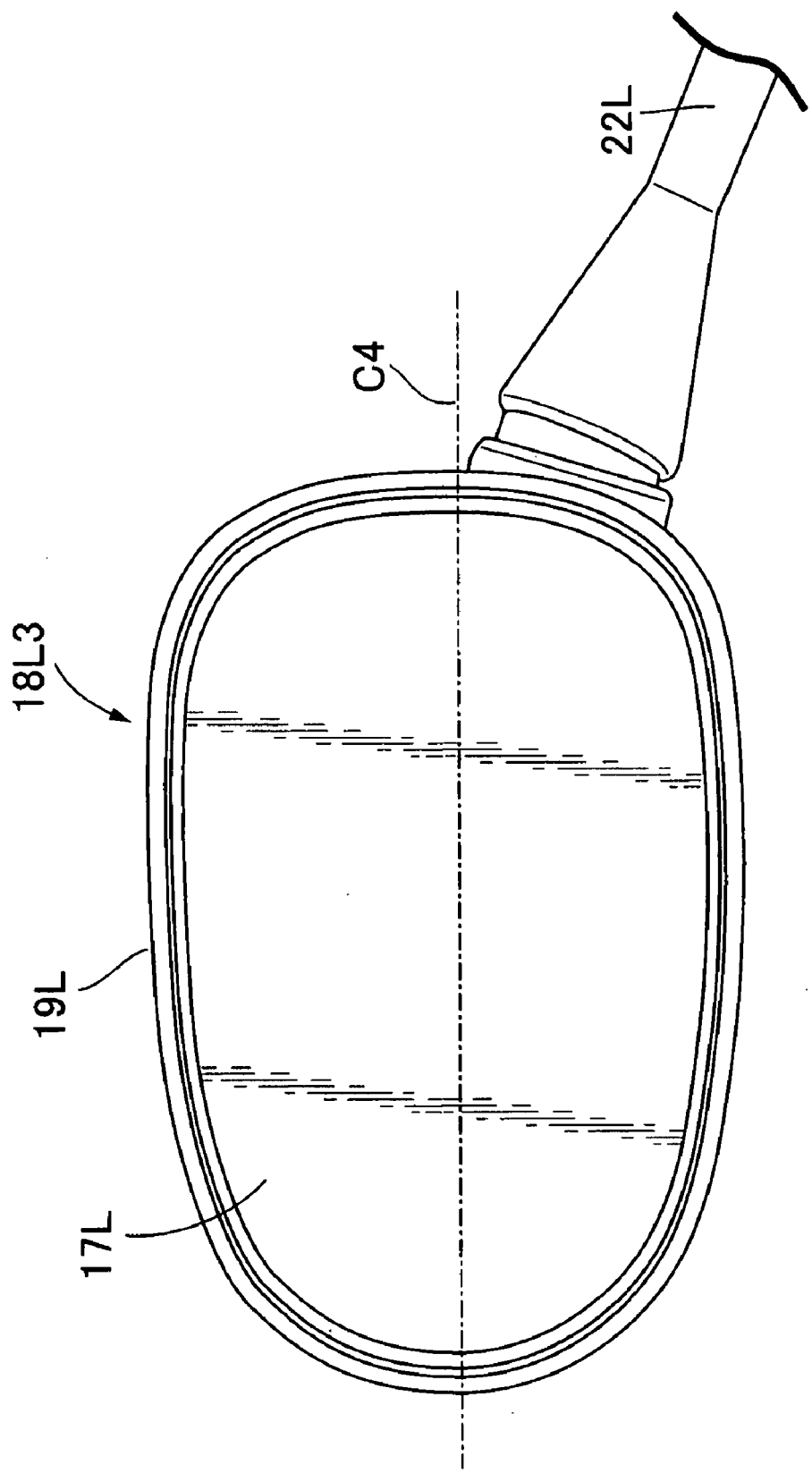
FIG. 15 is a front view of a left-side viewing section of a third embodiment.
Figure 16A:
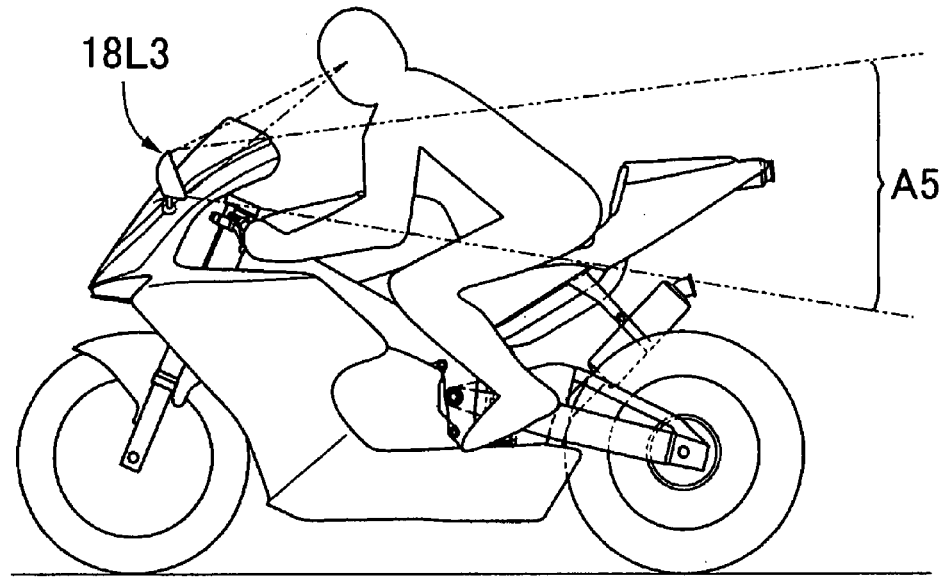
FIG. 16A is a side view showing a rear view region in the normal view position when there is one rider.
Figure 16B:
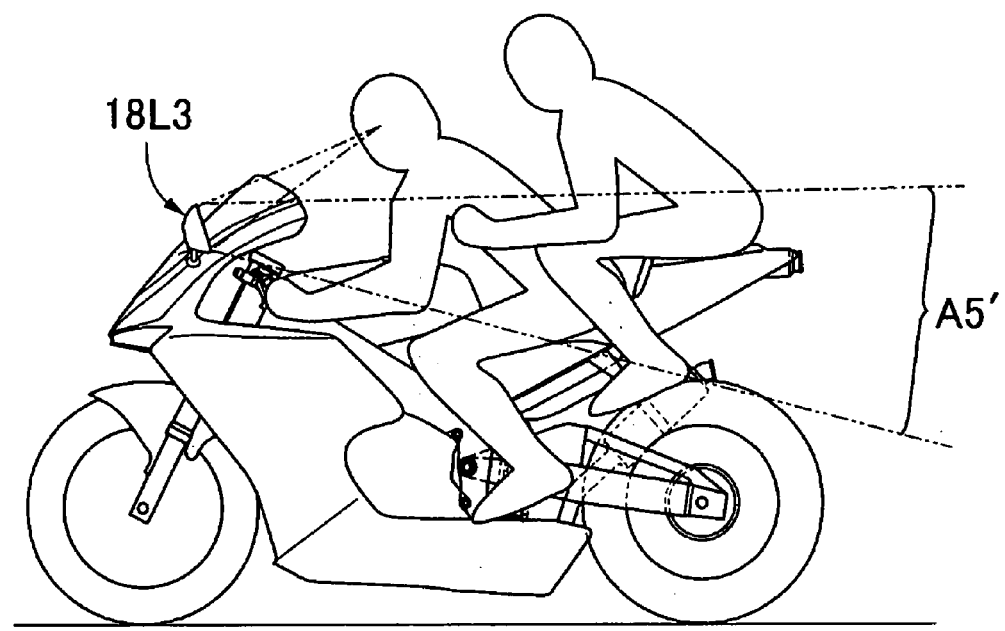
FIG. 16B is a side view showing a rear view region in the normal view position when there are two riders.
Figure 17:
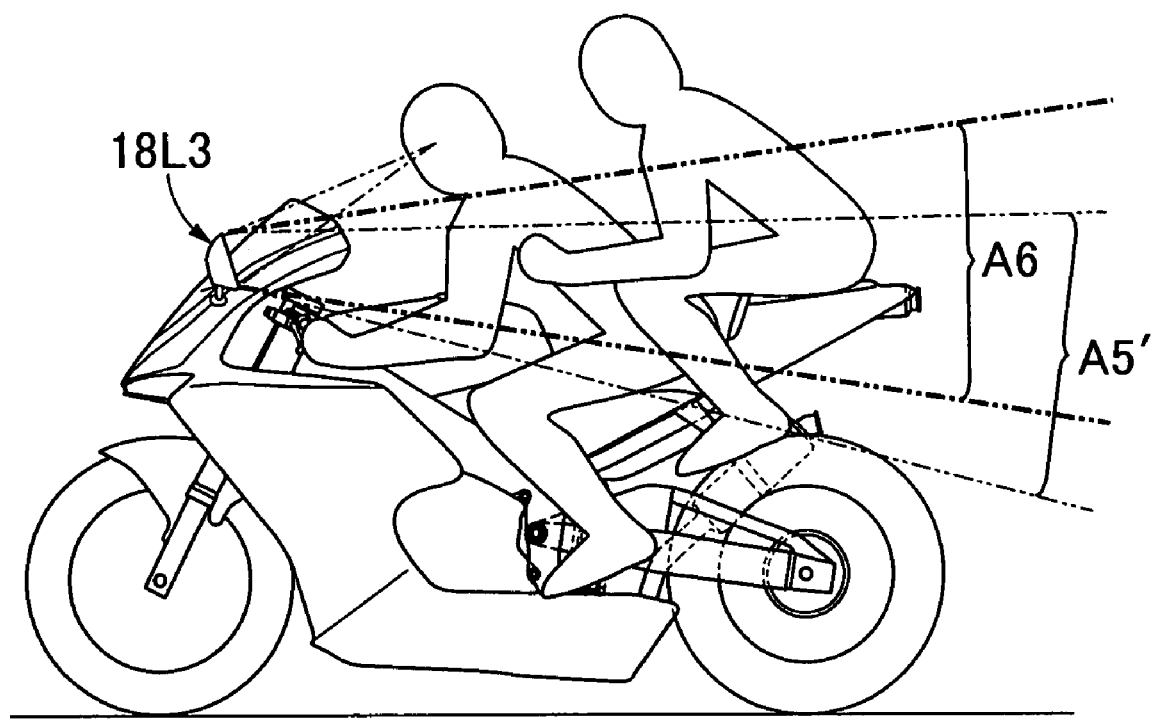
FIG. 17 is a side view showing a rear view region in the changed view position when there are two riders.

FIG. 15 to FIG. 17 show a third embodiment of the present invention. Parts corresponding to those in the first and embodiments are denoted by the same reference numerals and symbols, and detailed explanation thereof is omitted.

First, in FIG. 15, a left-side viewing section 18L3 is set so that a pivot axis C4 of a mirror holder holding a mirror 17L attains a substantially horizontal direction when a motorcycle is in an upright state, in order to change the direction of the mirror 17L so that it is more upward in a changed view position than in a normal view position.

In FIG. 16, a right-side viewing section is formed in the same manner as the left-side viewing section 18L3. A rear view region A5 is obtained in a position shown in FIG. 16A when there is one rider in a state in which the left-side viewing section 18L3 and the right-side viewing section are in a normal view position. On the other hand, when there are two riders, a rear view region A5' is obtained in a position lower than the rear view region A5 obtained when there is one rider, because a rear part of the vehicle body sinks due to the weight of the riders.

Then, if the left-side viewing section 18L3 and the right-side viewing section are changed from the normal view position to the changed view position as shown in FIG. 17, the rider can change the rear view region A5' upward to obtain a rear view region A6 that is substantially the same as the rear view region A5 obtained when there is one rider.

Therefore, it is possible to obtain an appropriate rear view corresponding to a change in the attitude of the vehicle body due to a change in the weight of a load on the rear part of the motorcycle.

Although embodiments of the present invention have been explained, the resent invention is not limited to the above-mentioned embodiments, and various changes can be made to the present invention without departing from the subject matter of the present invention.

For example, in the above-mentioned embodiments, the present invention is applied to a motorcycle, but the present invention may be applied widely to an open vehicle other than a motorcycle, such as a motor tricycle.

The present invention is also applicable to a case in which a mirror housing is mounted on a handlebar.

What is claimed is:

1. An open vehicle rear view system for use with an open vehicle having a vehicle body and a handlebar, the system comprising:
   a pair of mirrors for obtaining a rear view, the mirrors being disposed on left and right portions of the vehicle body or the handlebar in front of a driver;
   mirror housings mounted on the left and right portions of the vehicle body or the handlebar;
   mirror holders each having a holder plate that holds the mirror, and being supported on the mirror housing so that the mirror holder can pivot between a normal view position for obtaining a normal rear view and a changed view position which is changed from the normal view position;
   actuators enclosed within a continuous outer surface of an actuator case, each actuator including an electric motor rotatable in forward and reverse directions and a reduction mechanism for reducing output of the electric motor, each actuator being provided between the mirror housing and the mirror holder to exert power for pivoting the mirror holder, the actuator case having first and second restricting faces defined by the continuous outer surface of the actuator case;
   an operating member operated by the driver in order to select the normal view position or the changed view position of the mirror holders; and
   a drive control circuit including two pairs of position detection switches which are disposed at fixed positions within the two mirror housings in order to detect the normal view position and the changed view position of the mirror holders and determine a timing for terminating operation of the electric motors, and controlling operation of the electric motors so as to pivot the two mirror holders simultaneously according to operation of the operating member, wherein the normal view position is detected when the first restricting face abuts against the holder plate and the changed view position is detected when the second restricting face abuts against the holder plate.

2. The open vehicle rear view system according to claim 1, wherein each actuator comprises a drive arm which has a base end connected to the reduction mechanism so as to be pivoted by the reduction mechanism and a leading end connected to the mirror holder.

3. The open vehicle rear view system according to claim 1 or 2, wherein a pivot axis of each mirror holder is set in a vertical direction when the open vehicle is in an upright state, in order to change a direction of the mirror to be more outward in the changed view position than in the normal view position.

4. The open vehicle rear view system according to claim 1 or 2, wherein a pivot axis of each mirror holder is set so that the pivot axis is inclined inward to the vehicle body in going upward when the open vehicle is in an upright state, in order to change a direction of the mirror to be lower and more inward to the vehicle body in the changed view position than in the normal view position.

5. The open vehicle rear view system according to claim 1 or 2, wherein a pivot axis of each mirror holder is set to be substantially horizontal when an open vehicle is in an upright state, in order to change a direction of the mirror to be more upward in the changed view position than in the normal view position.

6. The open vehicle rear view system according to claim 1, wherein the drive control circuit comprises a switch circuit which switches the direction of rotation of the electric motors according to operation and non-operation of the operating member so that the electric motors cause the mirror holders to pivot to the changed view position in response to operation where the operating member urged to a side selecting the normal view position is operated to a side selecting the changed view position, and so that the electric motors cause the mirror holders to pivot to the normal view position in response to release of an operating force applied to the operating member.

7. The open vehicle rear view system according to claim 1, wherein the operating member is disposed on the handlebar so as to be operated by the driver grabbing the handlebar.

8. The open vehicle rear view system according to claim 1, wherein the reduction mechanism is arranged so as to transmit a pivoting drive force to the mirror holder after an operation amount of the electric motor has reached a predetermined operation amount.

9. The open vehicle rear view system according to claim 1, wherein the system further comprises click mechanisms each provided between the mirror housing and the mirror holder, each click mechanism causes the mirror holder to pivot stepwise between the normal view position and the changed view position.

* * * * *